US007700066B1

(12) United States Patent
Yang et al.

(10) Patent No.: US 7,700,066 B1
(45) Date of Patent: Apr. 20, 2010

(54) PROCESS FOR PREPARING ALPHA CALCIUM SULFATE HEMIHYDRATE

(75) Inventors: Jen-Chang Yang, Taipei (TW); Hong-Da Wu, Taipei (TW); Nai-Chia Teng, Taipei (TW); Sheng-Yang Lee, Taipei (TW)

(73) Assignee: Taipei Medical University, Taipei (TW)

( * ) Notice: Subject to any disclaimer, the term of this patent is extended or adjusted under 35 U.S.C. 154(b) by 0 days.

(21) Appl. No.: 12/245,644

(22) Filed: Oct. 3, 2008

(51) Int. Cl.
*C01B 17/96* (2006.01)
*C01F 11/46* (2006.01)
(52) U.S. Cl. .................................. 423/555
(58) Field of Classification Search ............... 423/555
See application file for complete search history.

(56) References Cited

U.S. PATENT DOCUMENTS 4,120,737 A * 10/1978 Berrie et al. ............... 106/772
5,248,487 A * 9/1993 Bold et al. .................. 423/171
6,780,391 B1 * 8/2004 Cooper ....................... 423/555

* cited by examiner

*Primary Examiner*—Timothy C Vanoy
(74) *Attorney, Agent, or Firm*—WPAT, P.C.; Anthony King; Kay Yang (57) ABSTRACT

The invention provides a process for preparing α-calcium sulfate hemihydrate which comprises the following steps: adding aqueous solutions containing sulfate ions and calcium ions to calcium chloride solution with a range of concentration; reacting the mixture of a) at a range of temperature for an appropriate time; filtering and washing the reaction products of b) with a rising solvent to isolate the solid and liquid phases; and d) collecting and drying the solid phase to obtain α-calcium sulfate hemihydrate with high purity; wherein the relationship between the range of the concentration of calcium chloride (y) and the range of the reaction temperature (x) is shown as the following formula: $-0.4x^5+7.33x^4-52.83x^3+187.17x^2-328.27x+316<y<1.2x^5-22x^4+158.5x^3-561.5x^2+984.8x-588$ $(2<X<5)$.

15 Claims, 6 Drawing Sheets

(a) Empty control (b) Osteoset®

(c) CaSO₄ of the invention

OB: old bone    NB: new bone    S: soft tissue    F: fibrin tissue

Figure 5

PROCESS FOR PREPARING ALPHA CALCIUM SULFATE HEMIHYDRATE

FIELD OF THE INVENTION

The invention relates to a process for preparing α-calcium sulfate hemihydrate with high purity. In particular, the invention provides a process for readily preparing α-calcium sulfate hemihydrate with high purity by adding specific salt ions and controlling the concentration of the salt and the reaction temperature to obtain α-calcium sulfate hemihydrate having purity higher than 98%.

BACKGROUND OF THE INVENTION

Calcium sulfate having the chemical formula $CaSO_4 \cdot xH_2O$ can be obtained from natural rock mines or by chemical synthesis. Calcium sulfate is traditionally used as a sulfur-based fertilizer, filler in paper, flux agent for casting-aluminum renal flux driers and pigment extender.

Figure 1:
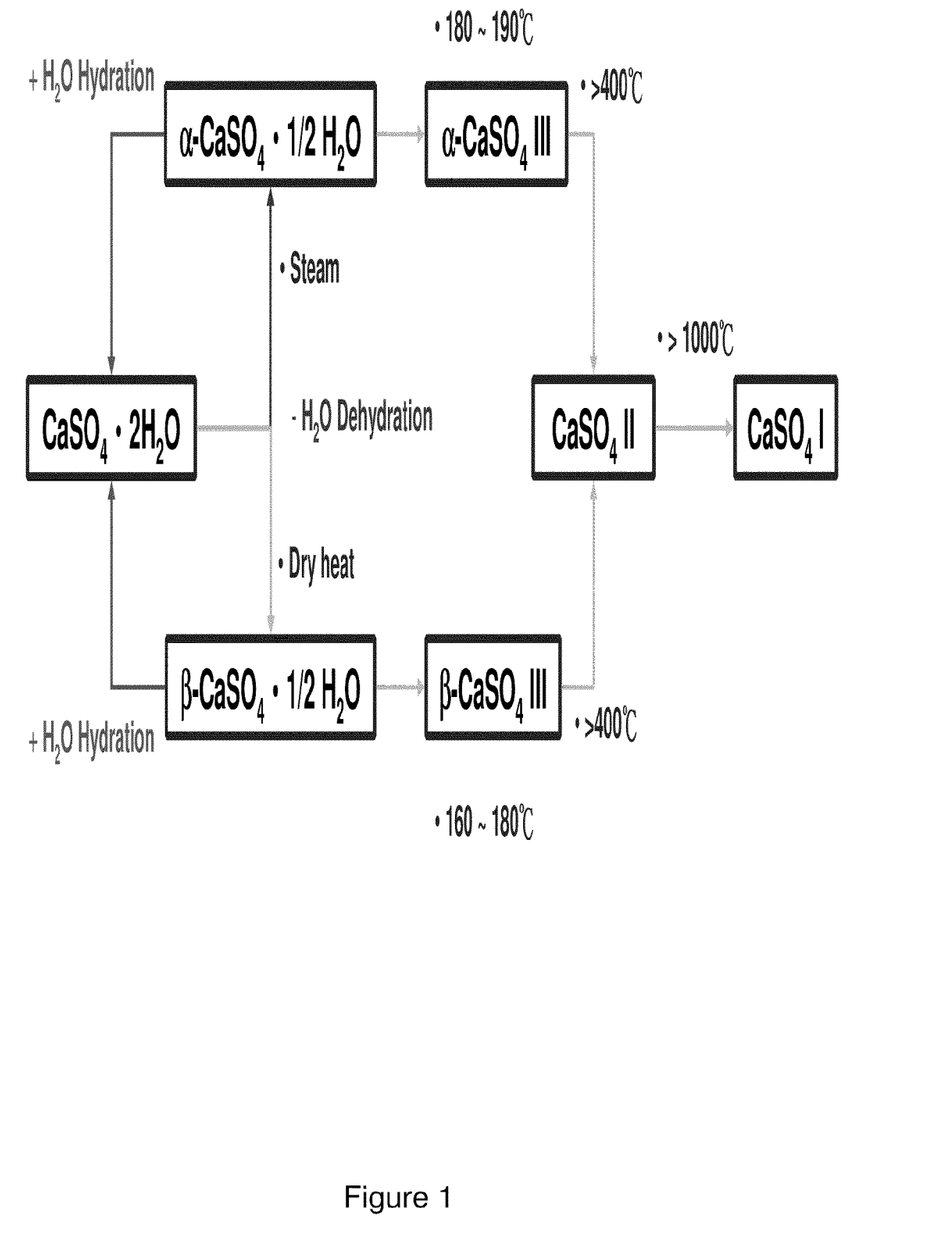
FIG. 1 shows the chemical processes of hydration and dehydration of calcium sulfate.

Water of crystallization is water that occurs in crystals but is not covalently bonded to a host molecule or ion. On the basis of the amount of crystal water, calcium sulfate can be classified as calcium sulfate dihydrate ($CaSO_4 \cdot 2H_2O$, i.e., gypsum), calcium sulfate hemihydrate ($CaSO_4 \cdot 0.5H_2O$, i.e., plaster of Paris) and calcium sulfate anhydrite ($CaSO_4$). The chemical processes of hydration and dehydration are shown in FIG. 1.

The dehydration of the calcium sulfate dihydrate begins at approximately 90° C. during heating. After the temperature rises to the range of 90 to 150° C., the hemihydrate form is produced. When the heating is continued, the crystal water of hemihydrate will be further removed and calcium sulfate anhydrite is formed. The following are the chemical reaction formulae of the above reactions:

$$CaSO_4 \cdot 2H_2O + heat \rightarrow CaSO_4 \cdot \tfrac{1}{2}H_2O + 1\tfrac{1}{2}H_2O \quad (1)$$

$$CaSO_4 \cdot \tfrac{1}{2}H_2O + heat \rightarrow CaSO_4 + \tfrac{1}{2}H_2O \quad (2)$$

Calcium sulfate hemihydrate exists in two chemically identical forms: alpha calcium sulfate hemihydrate (alpha (α)-CSH) and beta calcium sulfate hemihydrate (beta (β)-CSH). Although they are chemically identical, the CSH is considered a specialty product due to the different characteristics of the two forms. In particular, the alpha form is a larger, regularly shaped crystal and has a low water demand for hydration reaction. About 25~40 g of water are required to set a gypsum block from 100 g of the hemihydrate, and accordingly, the hydrated gypsum produced therefrom is a dense, high strength product. In contrast, the beta form is a smaller, irregular-shaped crystal and has a relatively high water demand; about 60~80 g water are required to set a gypsum block from 100 g of the hemihydrate, and a lower strength hydrated gypsum product is produced. The α-calcium sulfate hemihydrate has a small exothermic peak after the endothermic peak; however, the β-calcium sulfate hemihydrate does not have this peak.

U.S. Pat. No. 5,614,206 adds water in different ratios to α-calcium sulfate hemihydrate and β-calcium sulfate hemihydrate to solidify them into samples with 1.2 cm diameter and 4 cm height, and performs degradation testing in water. The pure β-calcium sulfate hemihydrate is dissolved within 28 days, whereas 16.1% of the α-calcium sulfate hemihydrate is dissolved in 35 days. The results show that the more α-calcium sulfate hemihydrate there is, the slower the dissolution in water will be. Therefore, degradation of α-calcium sulfate hemihydrate is better suited for bone regeneration period.

U.S. Pat. No. 3,410,655 discloses a process for preparing α-calcium sulfate hemihydrate from gypsum by-product comprising elutriating calcium sulfate dihydrate with water to remove organic impurities at a temperature between 60° C. to 90° C., forming an aqueous suspension of calcium sulfate dihydrate having a pH between 1.5 and 6, adding a crystal form improving agent to the dihydrate suspension, and heating it in an autoclave at a temperature between 105° C. and 125° C. U.S. Pat. No. 4,091,080 provides a method for the production of α-calcium sulfate hemihydrate, comprising suspending hydrated calcium sulfate containing ½ to 2 moles of crystal water in an aqueous solution containing at least 10% by weight of magnesium salts or zinc salts of carboxylic acids and subsequently heating the resultant suspension under atmospheric pressure at a temperature in the range of 80° C. to the boiling point of said aqueous solution. U.S. Pat. No. 4,120,737 uses the waste effluent containing sodium chloride/calcium chloride ammonia from the ammonia soda process to manufacture sodium carbonate as material to produce α-calcium sulfate hemihydrate wherein 40 to 98% by weight of sulfuric acid is added and the reaction is carried out at a temperature between 95° C. and 100° C. under atmospheric pressure or a temperature between 140° C. and 160° C. under 5-10 atmospheres absolute.

U.S. Pat. No. 4,432,954 discloses that α-calcium sulfate hemihydrate is obtained by calcining calcium sulfate dihydrate with a particle size of 250 μm, generated with flue-gas desulfurization in power plants or by a chemical process, e.g., in the production of phosphoric acid. The calcining process comprises producing initially a dispersion from calcium sulfate dihydrate and diluted 15 to 55 wt % of sulfuric acid solution and heating the same at a predetermined rate to about 373 K with industrial, dust-free waste heat, whereupon the solid components are separated from the aqueous sulfuric acid and are dried. U.S. Pat. No. 4,842,842 discloses a method for producing alpha-form gypsum hemihydrate, comprising heating an aqueous slurry containing gypsum dihydrate and a salt of sulfosuccinic acid as the catalyst for crystallization, thereby converting gypsum dihydrate into alpha-form gypsum hemihydrate. U.S. Pat. No. 5,015,450 provides a method for making calcium sulfate alpha-hemihydrate by recrystallization transformation or recrystallization of calcium sulfate dihydrate in the presence of saturated steam at a temperature of 110° C. to 180° C. A molded body is formed from the calcium sulfate dihydrate which has a plurality of pores having a pore volume amounting to 15 to 60% of the total volume of the entire molded body.

U.S. Pat. No. 5,248,487 relates to a process for the conversion of calcium sulfate dihydrate originating from flue gas desulfurization units into an alpha-hemihydrate, wherein a portion of the scrubbing liquor is concentrated to a calcium chloride content of about 20% to 40% by weight as the salt solution, magnesium chloride or potassium chloride are added to the salt solution to increase the concentration of the magnesium chloride or potassium chloride to about 2 to 8% by weight magnesium chloride and about 0.5 to 2% by weight potassium chloride. U.S. Pat. No. 6,652,825 provides a method of producing α-calcium sulfate hemihydrate with 90 to 95% purity, including the steps of exposing a mixture including a calcium sulfate form selected from the group consisting of calcium sulfate dihydrate, calcium sulfate beta-hemihydrate, water-soluble calcium sulfate anhydrite, and mixtures thereof, water, and a crystallization catalyst, to microwave radiation to produce calcium sulfate alpha-hemihydrate; and separating at least a portion of the calcium sulfate α-hemihydrate to provide a solid comprising calcium sulfate α-hemihydrate and a filtrate and/or remainder that can be recycled to provide at least one of a calcium sulfate form, water, a crystallization catalyst, a crystal habit modifier, and a surfactant for use in production of additional α-hemihydrate. Evans et al. reported in 1995 that using microwave to remove moisture was feasible ["A Study of the Dielectric Properties of Gypsum and their Relation to Microwave Drying Behavior", Proceedings of Microwave and High Frequency Heating Conference, St Johns College, Cambridge (1995)]; however, if the temperature is higher than 120° C., too much energy is provided so calcium sulfate anhydrite will be produced during the transformation of calcium sulfate hemihydrate.

U.S. Pat. No. 6,780,391 provides a method of producing α-calcium sulfate hemihydrate which is characterized by: forming an initial calcium sulfate dihydrate from potassium sulfate and calcium nitrate; drying the precipitate at 200° C. for 24 hours; subsequently rehydrating the calcium sulfate anhydrite in the form of a slurry by immersing it in deionized water; placing the resulting slurry at room temperature for three days; using 2.5 bar steam pressure to treat it for 2 hours and then drying the resulting products to obtain calcium sulfate alpha-hemihydrate. Obviously, the above process needs a longer production time and high pressure to perform the transformation of α-calcium sulfate hemihydrate.

In medical applications, calcium sulfate has been used as a bone graft substitute for regeneration or augmentation in many fields, from dentistry to orthopedics. For medical applications and particularly for implantation, high purity materials are obviously needed. Medical grade calcium sulfate (CS) is a biocompatible, bioabsorbable, and clinically versatile ceramic for use in bone repair. It is an osteoconductive material, so it can be used as a filler in regions with bone defects. Furthermore, antibodies, growth factors or demineralized bone matrix having osteoinduction material can be added to calcium sulfate so that calcium sulfate can be used as a carrier for bioactive materials to help the regeneration and healing of the regions with the bone defects.

According to ASTM F2224-03 Standard Specification for High Purity Calcium Sulfate Hemihydrate or Dihydrate for Surgical Implants, the total amount of heavy metals (such as mercury, arsenic, lead and cadmium) must be lower than 10 ppm and the amount of iron must be lower than 100 ppm. The α-calcium sulfate hemihydrate produced by using the by-product of calcium sulfate from the chemical processes in chemical factories may have residues of heavy metals and toxic substances. Therefore, there is still a need to develop a process for preparing α-calcium sulfate hemihydrate with high purity.

SUMMARY OF THE INVENTION

The invention provides a process for preparing a-calcium sulfate hemihydrate with high purity which comprises the following steps:
a) adding aqueous solutions containing sulfate ions and calcium ions to calcium chloride solution with a range of concentration;
b) reacting the mixture of a) at a range of temperature for an appropriate time;
c) filtering and washing the reaction products of b) with a rinsing solvent to isolate the solid and liquid phases;
d) collecting and drying the solid phase to obtain a-calcium sulfate hemihydrate with a high purity;
wherein the relationship between the range of the concentration of calcium chloride (X, molarity) and the range of the reaction temperature (Y, ° C.) is shown as the following formula:

$-0.4x^5+7.33x^4-52.83x^3+187.17x^2-328.27x+316<y<1.2x^5-22x^4+158.5x^3-561.5x^2+984.8x-588$ ($2<X<5$); wherein the temperature in b) is not provided by microwave and the sulfate ions and calcium ions in a) are not provided by calcium sulfate.

DETAILED DESCRIPTION OF THE INVENTION

The invention develops a process for readily preparing α-calcium sulfate hemihydrate with high purity by adding specific salt ions and controlling the concentration of the salt and the reaction temperature to obtain the α-hemihydrate having purity higher than 98% that can be used as medical grade bone implants. The process of the invention is simple and does not need to use an autoclave under high pressure and temperature.

The invention provides a process for preparing a-calcium sulfate hemihydrate with high purity which comprises the following steps:
a) adding aqueous solutions containing sulfate ions and calcium ions to calcium chloride solution with a range of concentration;
b) reacting the mixture of a) at a range of temperature for an appropriate time;
c) filtering and washing the reaction products of b) with a rising solvent to isolate the solid and liquid phases; and
d) collecting and drying the solid phase to obtain a-calcium sulfate hemihydrate with a high purity;
wherein the relationship between the range of the concentration of calcium chloride (X, molarity) and the range of the reaction temperature (Y, ° C.) is shown as the following formula:

$-0.4x^5+7.33x^4-52.83x^3+187.17x^2-328.27x+316<y<1.2x^5-22x^4+158.5x^3-561.5x^2+984.8x-588$ ($2<X<5$); wherein the temperature in b) is not provided by microwave and the sulfate ions and calcium ions in a) are not provided by calcium sulfate.

Figure 3:
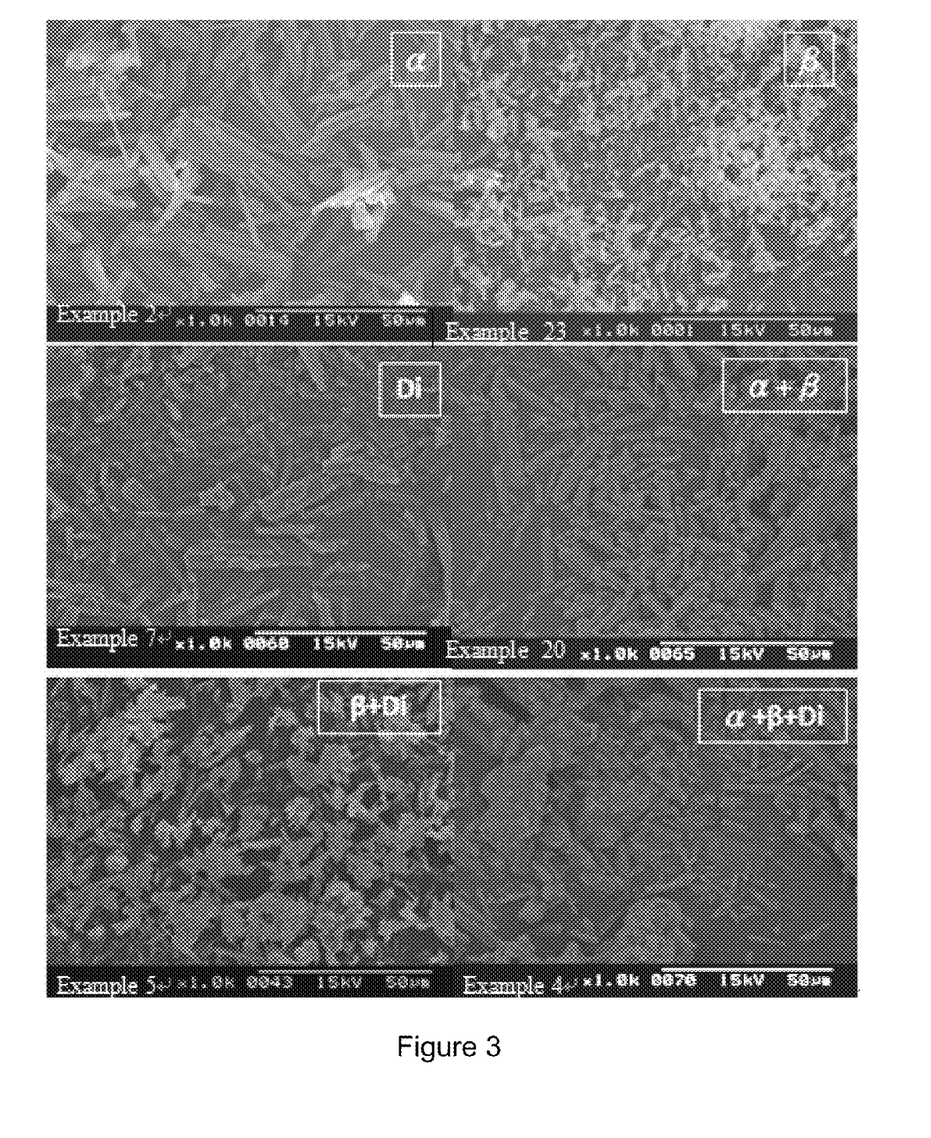
FIG. 3 shows the SEM diagrams of Examples 2, 4, 5, 7, 20 and 23.

According to the invention, the purity of α-calcium sulfate hemihydrate is controlled by the concentration of calcium chloride and reaction temperature in the process of the invention. The details of the above relationship are shown in FIG. 3. On the basis of the figure, one can use Microsoft Excel's polynomial regression analysis to obtain the following formula:

$$-0.4x^5+7.33x^4-52.83x^3+187.17x^2-328.27x+316<y<1.2x^5-22x^4+158.5x^3-561.5x^2+984.8x-588\ (2<X<5)$$

In the formula, Y represents the reaction temperature in step b) of the process of the invention and X represents the concentration of calcium chloride in step a) of the process of the invention. As long as the reaction temperature and the concentration of calcium chloride are controlled within the ranges shown in FIG. 3, the α-calcium sulfate hemihydrate prepared by the process of the invention has high purity and meets medical grade standards.

According to the invention, since microwave uses electromagnetic waves with frequencies between 0.3 GHz and 300 GHz to cause dielectric heating by absorption of energy in the water, the temperature will vary depending on the amount of the water. The change in temperature during microwave heating is difficult to control. Therefore, microwave heating is not an appropriate way for use in the process of the invention to control the purity and crystal from of calcium sulfate.

According to the invention, the solution containing sulfate ions of step a) is preferably selected from the group consisting of potassium sulfate, sodium sulfate and magnesium sulfate. According to the invention, the solution containing calcium ions of step a) is preferably selected from the group consisting of calcium nitrate and calcium phosphate.

According to a preferred embodiment of the invention, the calcium chloride in step b) is used as a catalyst in the reaction. The concentration of the calcium chloride solution preferably ranges from 2M to 4M, more preferably from 3M to 4M. More preferably, the concentration of the calcium chloride solution is 2.5M, 3M, 3.5M or 4M.

According to the invention, the reaction temperature of step b) is preferably higher than 80° C. to lower than 110° C., more preferably from 90° C. to lower than 110° C., most preferably from 90° C. to 100° C. According to one embodiment of the invention, the reaction temperature of step b) is 90° C. or 100° C. According to the invention, the reaction time is preferably over 2 hours.

According to the invention, when the filtering step of c) is carried out, it is preferable to wash the products with an alcohol. The alcohol is preferably selected from the group consisting of methanol, ethanol, propanol, butanol and pentanol. More preferably, the alcohol is ethanol.

According to the invention, any heating method other than microwave suitable for achieving and controlling the reaction temperature used in the process of the invention can be used. Heating baths with good temperature control are preferable.

The α-calcium sulfate hemihydrate produced by the process of the invention has purity higher than 98% and reaches the medical grade level. Such α-calcium sulfate hemihydrate can be widely used in medical applications such as bone implants, bone fillers and carriers for releasing drugs, bioactive ingredients and antibiotics.

EXAMPLE

Examples 1 to 7

Embodiments of Concentrations of Calcium Chloride Used in the Process of the Invention 0.1 mole of potassium sulfate and 0.1 mole of calcium nitrate were added to 4M (Example 1) calcium chloride solutions, individually, and heated at 95° C. in oil bath until reaching reaction temperature. The resulting two solutions were mixed and reacted at 90° C. for 120 minutes and then preliminarily filtered with a glass microfiber filter. The crystal products of calcium sulfate were washed with ethanol and were dried by freeze dryer or oven. The resulting products were preserved in a desiccator. Calcium chloride solutions with the concentrations of 3.5M (Example 2), 3M (Example 3), 2M (Example 4), 1M (Example 5), 0.5M (Example 6) and 0M (Example 7) were also used as a crystallization catalyst in the preparation procedure for α-calcium sulfate hemihydrate as stated above.

The crystalline form of the calcium sulfate products was detected with X-ray diffraction (XRD), differential scanning calorimetry (DSC) and SEM.

XRD 1 g of powder samples was put into the sample holder and then pressed with a slide. The sample holder was placed on an X-ray diffractometer (MaxRC, Rigaku, Japan) and a diffraction was performed using the light source with a wavelength of 1.54 Å (Kα=1.54 Å), a scanning rate of 10°/min and a scanning angle (2θ) in a range of 5° to 60°. The characteristic peaks of XRD were compared and analyzed on the basis of the Joint Committee on Powder Diffraction Standards (JCPDS) database. The characteristic peaks of sodium sulfate dihydrate were expressed as 2θ at 11.64°, 20.75°, 23.41° and 19.14° and the corresponding miller index assigned to each of the crystal faces were (020), (021), (040) and (041)). The characteristic peaks of sodium sulfate hemihydrate were expressed as 2θ at 14.75°, 25.71°, 29.76° and 31.91° and the corresponding miller index assigned to each of the crystal faces were (110), (020), (220), (−114)). However, the α-calcium sulfate hemihydrate and β-calcium sulfate hemihydrate should be further distinguished by DSC.

DSC 10 mg of samples were put in an aluminum disc and placed in the oven of a differential scanning calorimetry (TA Instrument, TA Q100, New Castle, Del., USA). At an elevated temperature rate of 10° C./min and with heating from room temperature to 400° C., the typical DSC diagram of calcium sulfate dihydrate had endothermic peaks at 130-150° C. and 200-210° C., whereas the DSC diagram of calcium sulfate hemihydrate mainly had an endothermic peak at 200-210° C. If there was an exothermic peak at about 230° C., it was α-calcium sulfate hemihydrate. If this exothermic peak did not exist, it was β-calcium sulfate hemihydrate. SEM.

Specimens of scaffold were fractured and were coated with gold on the specimen surface. Morphologies of samples were examined by using scanning electron microscope (Hitachi S2400, Japan). The crystal of alpha form is needle type, the beta form is small particle and dihydrate is big irregular type.

The results showed that the α-calcium sulfate hemihydrate with very high purity could be obtained when the concentrations of calcium chloride solutions were 3M, 3.5M and 4M. That is, the 2θ scanning of XRD showed characteristic peaks at 14.75°, 25.71°, 29.76° and 31.91° (those were characteristic peaks of α-calcium sulfate hemihydrate), the data of DSC showed that there was an endothermic peak at about 150-220° C. and an exothermic peak at about 230° C. and the diagram of SEM showed that the crystal is needle type. The above results showed that the calcium sulfate products were pure α-calcium sulfate hemihydrate and the detailed data are shown in Table 1 below.

TABLE 1

Effect of Concentrations of Salt Ions on Crystalline Forms of Calcium Sulfate

| | Item | Example 1 | Example 2 | Example 3 | Example 4 | Example 5 | Example 6 | Example 7 |
|---|---|---|---|---|---|---|---|---|
| Raw Materials | $Ca(NO_3)$ (mole) | 0.1 | 0.1 | 0.1 | 0.1 | 0.1 | 0.1 | 0.1 |
| | $K_2SO_4$ (mole) | 0.1 | 0.1 | 0.1 | 0.1 | 0.1 | 0.1 | 0.1 |
| | $CaSO_4$ (mole) | — | — | — | — | — | — | — |
| | Catalyst Conc. (M) | 4 | 3.5 | 3 | 2 | 1 | 0.5 | 0 |
| | Catalyst Salt | $CaCl_2$ | $CaCl_2$ | $CaCl_2$ | $CaCl_2$ | $CaCl_2$ | | |
| | Volume (ml) | 100 | 100 | 100 | 100 | 100 | 100 | 100 |
| Reaction Condition | Reaction Temp (° C.) | 90 | 90 | 90 | 90 | 90 | 90 | 90 |
| | Reaction Time (min) | 120 | 120 | 120 | 120 | 120 | 120 | 120 |
| | Rinse Solvent | Ethanol | Ethanol | Ethanol | Ethanol | Ethanol | Ethanol | Ethanol |
| | Solvent Conc. | 95% | 95% | 95% | 95% | 95% | 95% | 95% |
| | XRD | HH | HH | HH with DH | HH with DH | HH with DH | DH | DH |
| Characterization | Endo Peak $T_{150}$ (° C.) | ~150 | ~150 | ~150 | ~150 | ~150 | ~130 | ~130 |
| | Endo Peak $T_{220}$ (T° C.) | 220 | 220 | 220 | 220 | 220 | 220 | 220 |
| | Exo Peak (° C.) | ~230 | ~230 | ~230 | | | | |
| | Type of $CaSO_4$ | α-HH | α-HH | α-HH + trace DH | α-HH + β-HH + trace DH | β-HH + tace DH | β-HH + tace DH | DH |

| | Item | Comparative Example 1 | Comparative Example 2 | Comparative Example 3 |
|---|---|---|---|---|
| Raw Materials | $Ca(NO_3)$ (mole) | | 0.1 | 0.1 |
| | $K_2SO_4$ (mole) | | 0.1 | 0.1 |
| | $CaSO_4$ (mole) | 0.1 | — | — |
| | Catalyst Conc. (M) | 3.5 | 3.5 | 3.5 |
| | Catalyst Salt | $CaCl_2$ | $CaCl_2$ | KCl |
| | Volume (ml) | 100 | 100 | 100 |
| Reaction Condition | Reaction Temp (° C.) | 90 | 100 (microwave) | 90 |
| | Reaction Time (min) | 120 | 20 | 120 |
| | Rinse Solvent | Ethanol | IPA | Ethanol |
| | Solvent Conc. | 95% | 95% | 95% |
| | XRD | HH with DH | X | DH + HH |
| Characterization | Endo Peak $T_{150}$ (° C.) | ~150 | | |
| | Endo Peak $T_{220}$ (T° C.) | 220 | | |
| | Exo Peak (° C.) | ~230 | | |
| | Type of $CaSO_4$ | α-HH + trace DH | X | DH + HH |

Figure 2A:
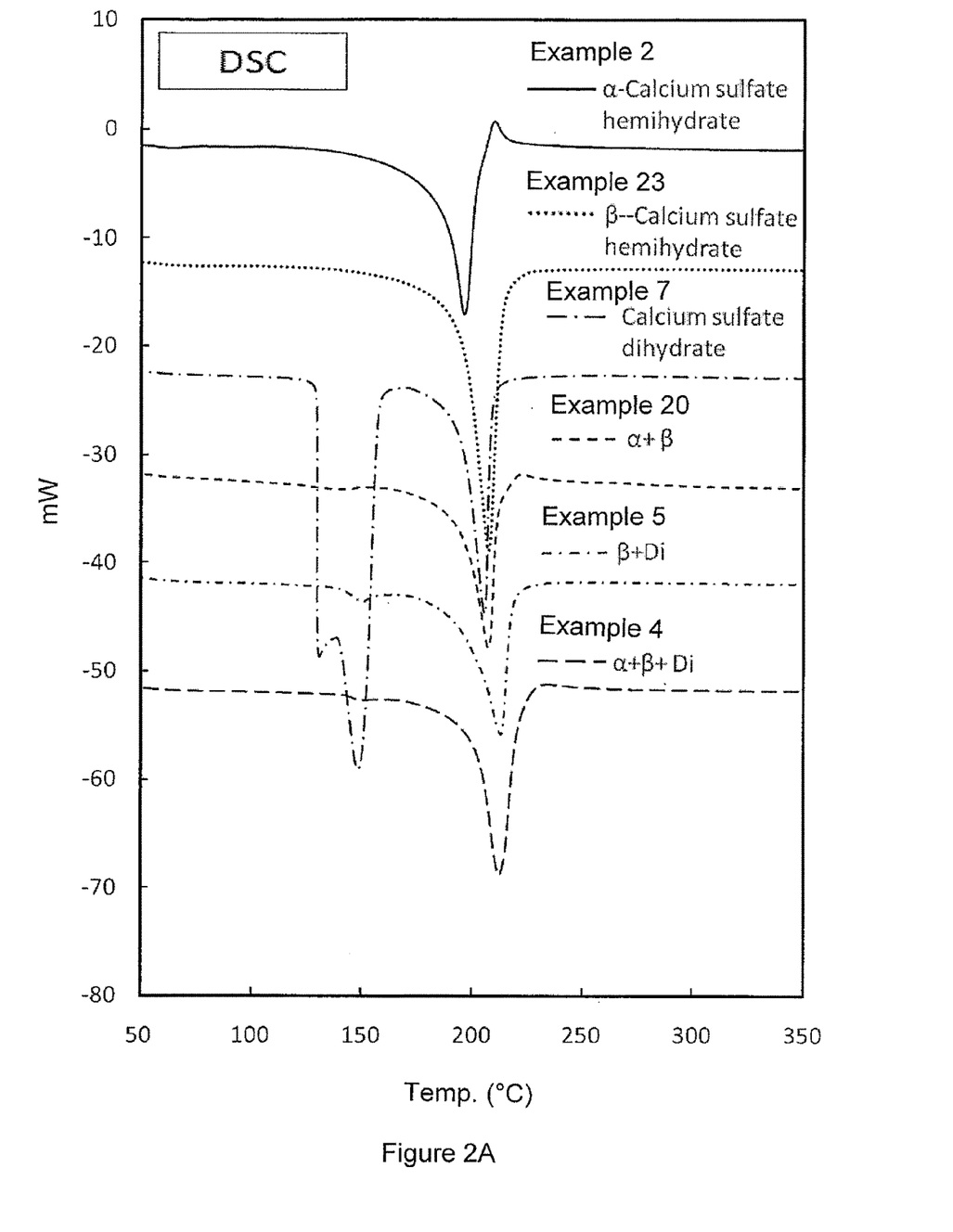
FIG. 2A shows the DSC diagrams of Examples 2, 4, 5, 7, 20 and 23.
Figure 2B:
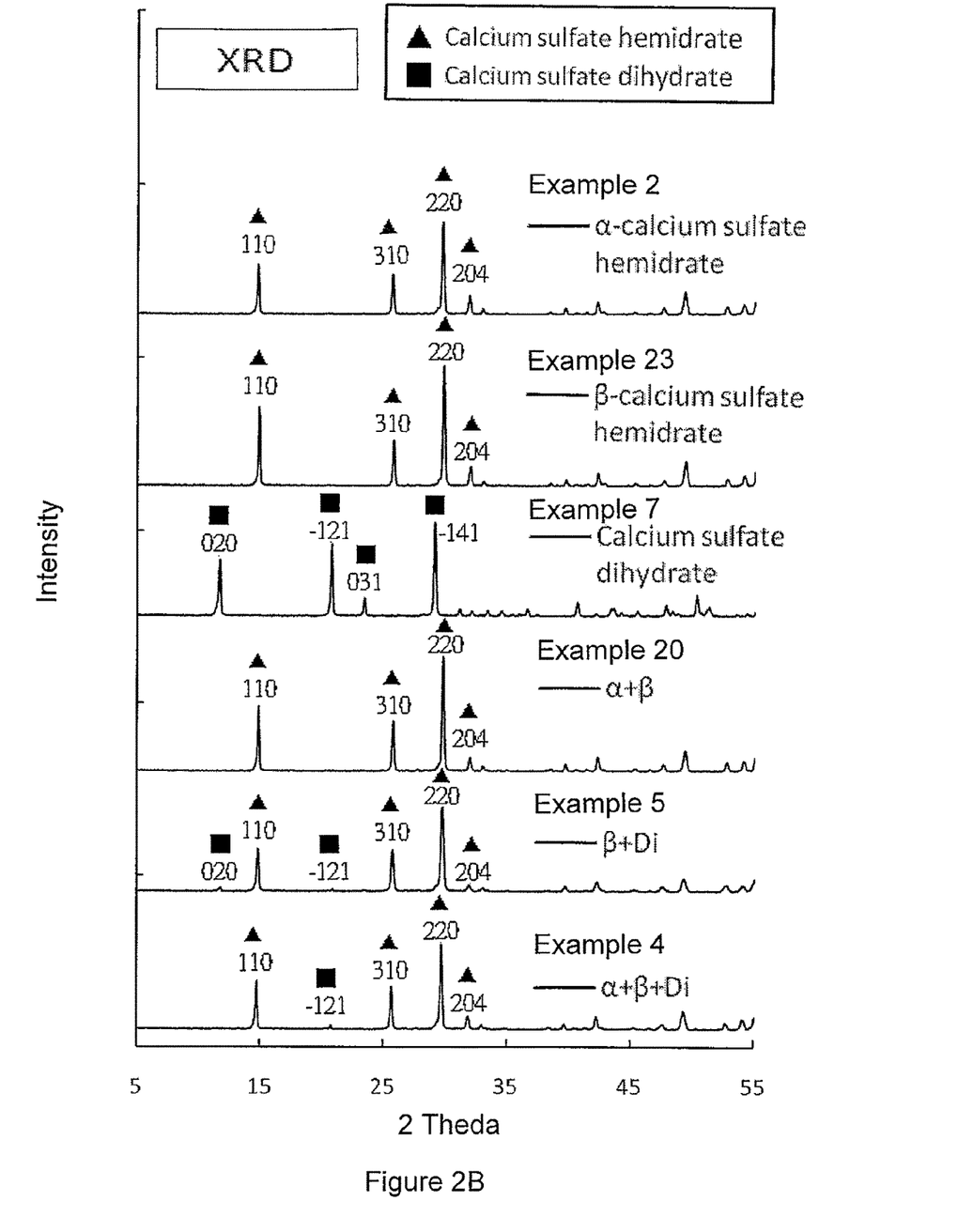
FIG. 2B shows the XRD diagrams of Examples 2, 4, 5, 7, 20 and 23.

Note:
DH: $CaSO_4 \cdot 2H_2O$;
HH: $CaSO_4 \cdot 0.5H_2O$;
α-HH: α-$CaSO_4 \cdot 0.5H_2O$;
β-HH: β-$CaSO_4 \cdot 0.5H_2O$;
X: unknown As the concentrations of calcium chloride decreased, small amounts of β-calcium sulfate hemihydrate and calcium sulfate dihydrate began to appear (2M calcium chloride). In 1 m calcium chloride solution, β-calcium sulfate hemihydrate and calcium sulfate dihydrate appeared. Furthermore, when calcium chloride was not used as crystallization catalyst, the resulting products were calcium sulfate dihydrate. The XRD and DSC as well as SEM diagrams of Examples 2, 4, 5 and 7 are shown in FIGS. 2B, 2A and 3, respectively.

Comparative Example 1

Comparison of Products Produced by the Processes of U.S. Pat. No. 4,842,842 and the Invention In U.S. Pat. No. 4,842,842, the calcium sulfate dihydrate was used as raw material in the preparation of α-calcium sulfate hemihydrate. In the process of the invention, 0.1 mole calcium sulfate dihydrate in 100 ml of 3.5M calcium chloride solution instead of potassium sulfate and calcium nitrate was used as raw material and the reaction was performed according to the conditions stated in Example 1. The resulting products were analyzed by XRD and DSC and the results are shown in Table 1 above. The XRD results showed that the products were mainly calcium sulfate hemihydrate but had small amounts of calcium sulfate dihydrate. The DSC results showed that there was an endothermic peak at 150-220° C. and an exothermic peak at about 230° C., which meant that the products were mainly α-calcium sulfate hemihydrate but had calcium sulfate dihydrate residues.

Comparative Example 2

0.1 mole potassium sulfate and 0.1 mole calcium nitrate were added to 3.5M calcium chloride solutions individually. In the technique disclosed in U.S. Pat. No. 6,652,825, microwave was used as heating source to heat the resulting solution for 20 minutes. The solution was filtered and dried according to the steps described in Example 1. The resulting products were analyzed by XRD and DSC and the results thereof were indicated in Table 1 above. The results showed that not all of the products were calcium sulfate hemihydrate or dehydrate, so microwave heating was not suitable for the process of the invention.

Comparative Example 3

Except for potassium chloride which was used as the crystallization catalyst, all ingredients and steps were the same as those described in Example 1. The resulting products were analyzed by XRD and DSC and the results showed that in addition to calcium sulfate hemihydrate, the products contained impurities. Furthermore, according to the DSC data, there were endothermic peaks at 150° C. and 220° C. but no exothermic peak. It showed that the calcium sulfate hemihydrate in the products was mainly β-calcium sulfate hemihydrate but had calcium sulfate dihydrate residues.

Examples 8 to 14

Effect of Reaction Temperature on Crystalline Form of Calcium Sulfate (3.5M $CaCl_2$)

To assess the effect of reaction temperature on the crystalline form of calcium sulfate, 0.1 mole each of potassium sulfate and calcium nitrate were dissolved in 3.5M calcium chloride solution so that the effect of reaction temperature on reaction products could be observed. The testing samples were added according to the ratios of Table 2, mixed well and reacted at 25° C. (Example 8), 50° C. (Example 9), 70° C. (Example 10), 80° C. (Example 11), 90° C. (Example 12), 100° C. (Example 13) and 110° C. (Example 14) for 120 minutes. XRD and DSC were performed according to the methods stated in Example 1. The results are shown in Table 2 below.

TABLE 2

Effect of Reaction Temperature on Crystalline Form of Calcium Sulfate

| | | Example 8 | Example 9 | Example 10 | Example 11 | Example 12 | Example 13 | Example 14 |
|---|---|---|---|---|---|---|---|---|
| Raw Materials | $Ca(NO_3)$ (mole) | 0.1 | 0.1 | 0.1 | 0.1 | 0.1 | 0.1 | 0.1 |
| | $K_2SO_4$ (mole) | 0.1 | 0.1 | 0.1 | 0.1 | 0.1 | 0.1 | 0.1 |
| | Catalyst Conc. (M) | 3.5 | 3.5 | 3.5 | 3.5 | 3.5 | 3.5 | 3.5 |
| | Catalyst Salt | $CaCl_2$ | $CaCl_2$ | $CaCl_2$ | $CaCl_2$ | $CaCl_2$ | $CaCl_2$ | $CaCl_2$ |
| | Volume (ml) | 100 | 100 | 100 | 100 | 100 | 100 | 100 |
| Reaction Condition | Reaction Temp (° C.) | 25 | 50 | 70 | 80 | 90 | 100 | 110 |
| | Reaction Time (min) | 120 | 120 | 120 | 120 | 120 | 120 | 120 |
| | Rinse Solvent | Ethanol | Ethanol | Ethanol | Ethanol | Ethanol | Ethanol | Ethanol |
| | Solvent Conc. | 95% | 95% | 95% | 95% | 95% | 95% | 95% |
| | XRD | DH | DH | DH | DH | HH | HH | HH |
| Characterization | Endo Peak $T_{150}$ (° C.) | 120~130 | 120~130 | 130 & 150 | 130 & 150 | | | |
| | Endo Peak $T_{220}$ (T° C.) | ~220 | ~220 | ~220 | ~220 | ~220 | ~220 | ~220 |
| | Exo Peak (° C.) | | | | | ~230 | ~230 | |
| | Type of $CaSO_4$ | DH | DH | DH | DH | α-HH | α-HH | β-HH |

Note:
DH: $CaSO_4 \cdot 2H_2O$;
HH: $CaSO_4 \cdot 0.5H_2O$;
α-HH: α-$CaSO_4 \cdot 0.5H_2O$;
β-HH: β-$CaSO_4 \cdot 0.5H_2O$ It was found that when reaction temperatures were lower than 90° C., the XRD results showed that the products were calcium sulfate dihydrate, but when reaction temperature was 90° C., the products were high purity α-calcium sulfate hemihydrate. When the temperature was up to 110° C., the results of Example 13 showed that the products were β-calcium sulfate hemihydrate. From the results of Example, 8, 9, 10, 11, 12, 13 and, 14 it can be concluded that different forms of calcium sulfate can be obtained by controlling reaction temperature.

Examples 15 to 17

Effect of Reaction Temperature on Crystalline Form of Calcium Sulfate (3M $CaCl_2$)

To assess the effect of reaction temperature on the crystalline form of calcium sulfate, 0.1 mole each of potassium sulfate and calcium nitrate were dissolved in 3M calcium chloride solution so that the effect of reaction temperature on reaction products could be observed. The testing samples were added according to the ratios of Table 2, mixed well and reacted at 90° C. (Example 15), 100° C. (Example 16) and 110° C. (Example 17) for 120 minutes. XRD and DSC were performed according to the methods stated in Example 1. The results were shown in Table 3 below.

TABLE 3

Effect of Reaction Temperature on Crystalline Form of Calcium Sulfate

|  |  | Example 15 | Example 16 | Example 17 |
|---|---|---|---|---|
| Raw Materials | Ca(NO$_3$)(mole) | 0.1 | 0.1 | 0.1 |
|  | K$_2$SO$_4$ (mole) | 0.1 | 0.1 | 0.1 |
|  | Catalyst Conc.(M) | 3 | 3 | 3 |
|  | Catalyst Salt | CaCl$_2$ | CaCl$_2$ | CaCl$_2$ |
|  | Volume (ml) | 100 | 100 | 100 |
| Reaction Condition | Reaction Temp (° C.) | 90 | 100 | 110 |
|  | Reaction Time (min) | 120 | 120 | 120 |
|  | Rinse Solvent | Ethanol | Ethanol | Ethanol |
|  | Solvent Conc. | 95% | 95% | 95% |
|  | XRD | HH | HH | HH |
|  | Endo Peak T$_{150}$ (° C.) |  |  |  |

TABLE 3-continued

Effect of Reaction Temperature on Crystalline Form of Calcium Sulfate

|  |  | Example 15 | Example 16 | Example 17 |
|---|---|---|---|---|
| Characterization | Endo Peak T$_{220}$ (T° C.) | ~220 | ~220 | ~220 |
|  | Exo Peak (° C.) |  |  |  |
|  | Type of CaSO$_4$ | α-HH | α-HH | β-HH |

Note:
DH: CaSO$_4$•2H$_2$O;
HH: CaSO$_4$•0.5H$_2$O;
α-HH: α-CaSO$_4$•0.5H$_2$O;
β-HH: β-CaSO$_4$•0.5H$_2$O It was found that when reaction temperatures were 100° C. and 90° C., the resulting products were high purity α-calcium sulfate hemihydrate. However, when the temperature was up to 110° C., the reaction products were β-calcium sulfate hemihydrate.

Examples 18, 19, 20

Effect of Reaction Temperature on Crystalline Form of Calcium Sulfate (4M CaCl$_2$)

To assess the effect of reaction temperature on the crystalline form of calcium sulfate, 0.1 mole each of potassium sulfate and calcium nitrate were dissolved in 4M calcium chloride solution so that the effect of reaction temperature on reaction products could be observed. The testing samples were added according to the ratios of Table 2, mixed well and reacted at 80° C. (Example 18), 90° C. (Example 19) and 110° C. (Example 20) for 120 minutes. XRD, DSC and SEM were performed according to the methods stated in Example 1. The results were shown in Table 4 below.

TABLE 4

Effect of Reaction Temperature on Crystalline Form of Calcium Sulfate

|  |  | Example 18 | Example 19 | Example 20 |
|---|---|---|---|---|
| Raw Materials | Ca(NO$_3$)(mole) | 0.1 | 0.1 | 0.1 |
|  | K$_2$SO$_4$ (mole) | 0.1 | 0.1 | 0.1 |
|  | Catalyst Conc.(M) | 4 | 4 | 4 |
|  | Catalyst Salt | CaCl$_2$ | CaCl$_2$ | CaCl$_2$ |
|  | Volume (ml) | 100 | 100 | 100 |
| Reaction Condition | Reaction Temp (° C.) | 80 | 90 | 110 |
|  | Reaction Time (min) | 120 | 120 | 120 |
|  | Rinse Solvent | Ethanol | Ethanol | Ethanol |
|  | Solvent Conc. | 95% | 95% | 95% |
|  | XRD | HH | HH | HH |
|  | Endo Peak T$_{150}$ (° C.) | 150 | 150 |  |
| Characterization | Endo Peak T$_{220}$ (T° C.) | ~220 | ~220 | ~220 |
|  | Exo Peak (° C.) |  |  | ~230 |
|  | Type of CaSO$_4$ | DH | α-HH | α-HH,β-HH |

Note:
DH: CaSO$_4$•2H$_2$O;
HH: CaSO$_4$•0.5H$_2$O;
α-HH: α-CaSO$_4$•0.5H$_2$O;
β-HH: β-CaSO$_4$•0.5H$_2$O It was found that when reaction temperature was 110° C., the resulting products were α-calcium sulfate hemihydrate and β-calcium sulfate hemihydrate. However, when the temperature was down to 90° C., the reaction products were α-calcium sulfate hemihydrate. Furthermore, when the reaction temperature was down to 80° C., the reaction products were calcium sulfate dihydrate.

The XRD and DSC as well as SEM diagrams of Example 20 are shown in FIGS. 2B, 2A and 3, respectively.

Examples 21, 22, 23, 24, 25

Effect of Reaction Time on Crystalline Form of Calcium Sulfate

To assess the effect of reaction time on the crystalline forms of calcium sulfate, 0.1 mole potassium sulfate and 0.1 mole of calcium nitrate were reacted according to the reaction steps and conditions stated in Example 1 but the reaction time was 1 minute (Example 21), 15 minutes (Example 22), 60 minutes (Example 23), 120 minutes (Example 24) and 240 minutes (Example 25). The XRD and DSC testing results are shown in Table 5 below.

TABLE 5

Effect of Reaction Time on Crystalline Form of Calcium Sulfate

| | Item | Example 21 | Example 22 | Example 23 | Example 24 | Example 25 |
|---|---|---|---|---|---|---|
| Raw Materials | $Ca(NO_3)$ (mole) | 0.1 | 0.1 | 0.1 | 0.1 | 0.1 |
| | $K_2SO_4$ (mole) | 0.1 | 0.1 | 0.1 | 0.1 | 0.1 |
| | Catalyst Conc. (M) | 3.5 | 3.5 | 3.5 | 3.5 | 3.5 |
| | Catalyst Salt | $CaCl_2$ | $CaCl_2$ | $CaCl_2$ | $CaCl_2$ | $CaCl_2$ |
| | Volume (ml) | 100 | 100 | 100 | 100 | 100 |
| Reaction Condition | Reaction Temp (° C.) | 90 | 90 | 90 | 90 | 90 |
| | Reaction Time (min) | 1 | 15 | 60 | 120 | 240 |
| | Rinse Solvent | Ethanol | Ethanol | Ethanol | Ethanol | Ethanol |
| | Solvent Conc. | 95% | 95% | 95% | 95% | 95% |
| | XRD | HH with DH | HH | HH | HH | HH |
| Characterization | Endo Peak $T_{150}$ (° C.) | ~150 | | | | |
| | Endo Peak $T_{220}$ (T° C.) | ~210 | ~210 | ~210 | ~210 | ~210 |
| | Exo Peak (° C.) | | | ~230 | ~230 | ~230 |
| | Type of $CaSO_4$ | β-HH with DH | β-HH | β-HH | α-HH | α-HH |

Note:
DH: $CaSO_4 \cdot 2H_2O$;
HH: $CaSO_4 \cdot 0.5H_2O$;
α-HH: α-$CaSO_4 \cdot 0.5H_2O$;
β-HH: β-$CaSO_4 \cdot 0.5H_2O$ The XRD and DSC as well as SEM diagrams of Example 23 are shown in FIGS. 2B, 2A and 3, respectively.

When the reaction time was less than 2 hours, the resulting products were β-calcium sulfate hemihydrate; however, when the reaction time was more than 2 hours, the resulting products were α-calcium sulfate hemihydrate.

Figure 4:
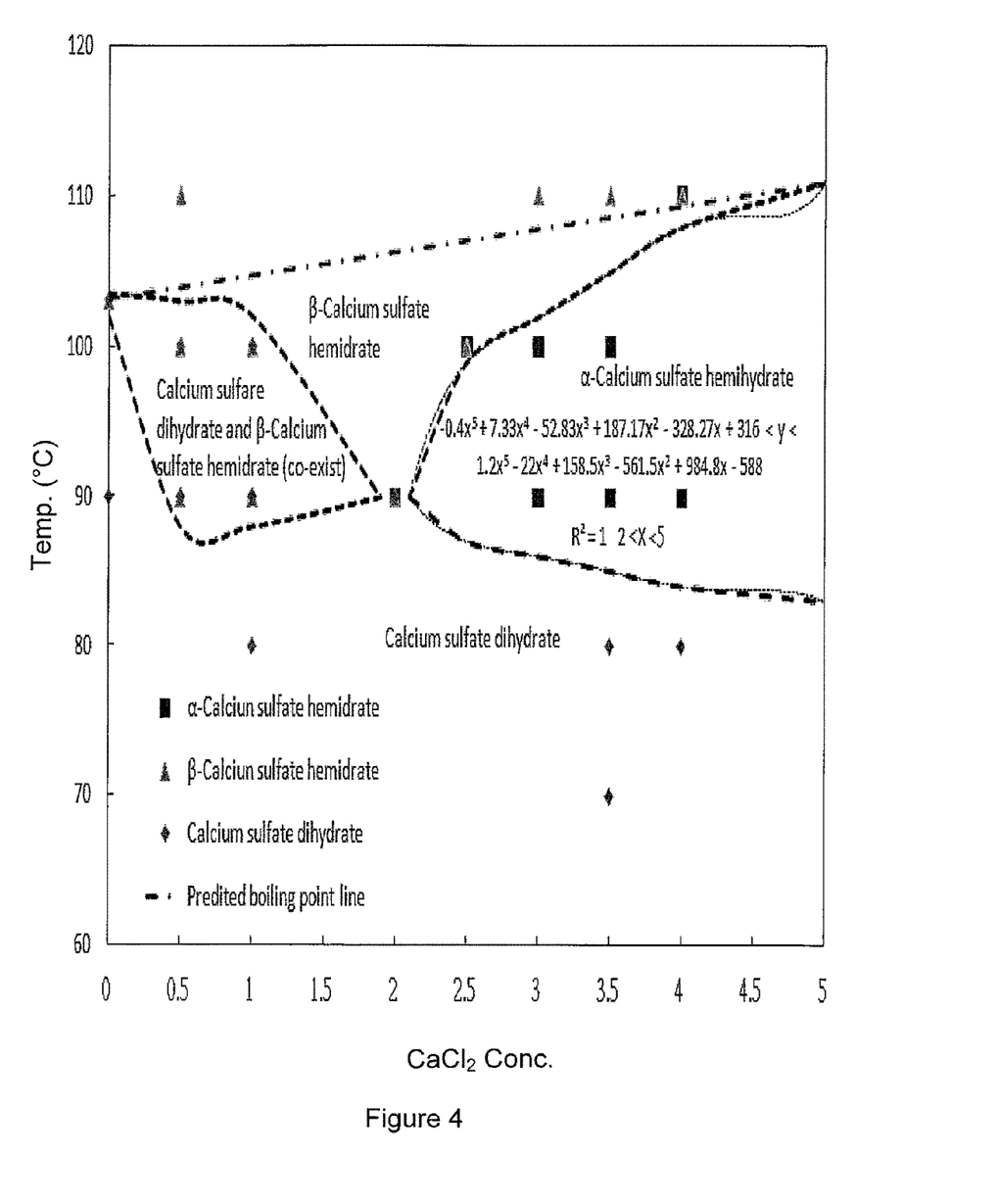
FIG. 4 shows the plot on the basis of the concentration of calcium chloride and the reaction temperatures.

In accordance with the data given in the above examples, FIG. 4 was plotted on the basis of the concentration of calcium chloride and the reaction temperatures. The relationship between the range of the concentration of calcium chloride (y) and the range of the reaction temperature (x) through calculation can be shown as the following formula: $-0.4x^5 + 7.33x^4 - 52.83x^3 + 187.17x^2 - 328.27x + 316 < y < 1.2x^5 - 22x^4 + 158.5x^3 - 561.5x^2 + 984.8x - 588$ (2<X<5).

Comparative Examples 4 and 5

0.1 mole potassium sulfate and 0.1 mole calcium nitrate were added to 3.5M calcium chloride solutions individually. The two solutions were heated to 95° C. in oil bath and then mixed for reaction at 90° C. After 2 hours, the resulting solutions were filtered and the filtered samples were washed with different rinsing solvents, isopropanol and water, respectively. The effect of rinsing solvents on the crystalline form of calcium sulfate was shown in Table 6 below.

TABLE 6

Effect of Rinsing Solvents on the Crystalline Form of Calcium Sulfate

| | Item | Comparative Example 4 | Comparative Example 5 |
|---|---|---|---|
| Raw Materials | $Ca(NO_3)$ (mole) | 0.1 | 0.1 |
| | $K_2SO_4$ (mole) | 0.1 | 0.1 |
| | Catalyst Conc. (M) | 3.5 | 3.5 |
| | Catalyst Salt | $CaCl_2$ | $CaCl_2$ |
| | Volume (ml) | 100 | 100 |
| Reaction Condition | Reaction Temp (° C.) | 90 | 90 |
| | Reaction Time (min) | 120 | 120 |
| | Rinse Solvent | IPA | Water |
| | Solvent Conc. | 95% | |
| | XRD | HH | DH |
| Characterization | Endo Peak $T_{150}$ (° C.) | | 150 |
| | Endo Peak $T_{220}$ (° C.) | ~220 | ~220 |
| | Exo Peak (° C.) | ~230 | |
| | Type of $CaSO_4$ | β-HH + α-HH | DH |

Note:
DH: $CaSO_4 \cdot 2H_2O$;
HH: $CaSO_4 \cdot 0.5H2O$;
α-HH: α-$CaSO_4 \cdot 0.5H_2O$;
β-HH: β-$CaSO_4 \cdot 0.5H_2O$ As shown in Example 2, the sample washed with alcohol was α-calcium sulfate hemihydrate, whereas the sample washed with isopropanol was not totally α-calcium sulfate hemihydrate. Therefore, alcohol is a better rinsing solvent than isopropanol.

Example 24

Figure 5:
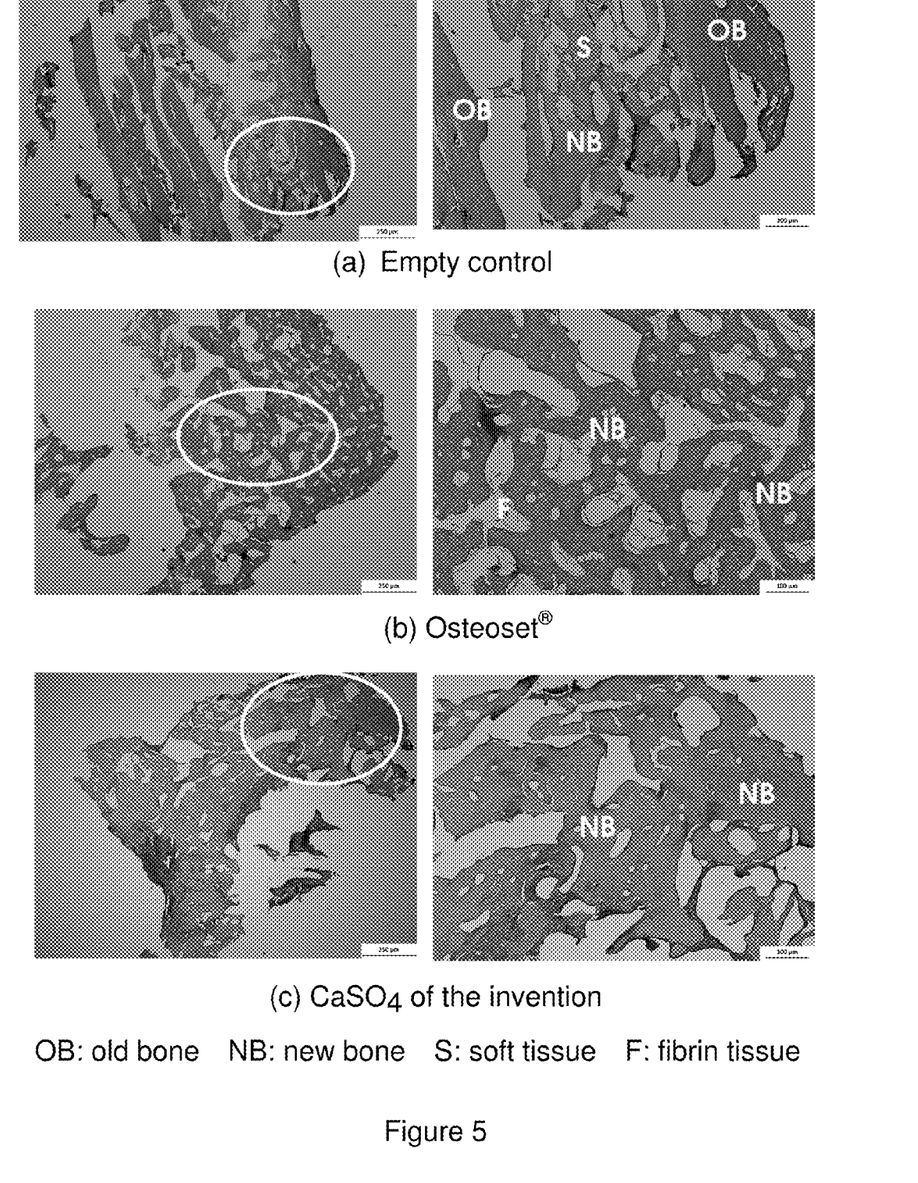
FIG. 5 shows photomicrographs of (a) empty control (b) Osteoset® (c) CaSO$_4$ of the invention after implanted for 6 weeks in beagle model. (OB: old bone, NB: new bone, S: soft tissue, F: fibrin tissue).

Animal Test of the Effect of Using α-Calcium Sulfate Hemihydrate Produced by the Process of the Invention Beagle dogs with mean age of 6 months were operated on under general anesthesia. The premolars, second premolars, third premolars and first molars in the mandible were extracted. The defects were implanted by using graft materials: empty control, Osteoset® (Wright Medical Group, Inc., USA) and α-calcium sulfate hemihydrate produced by the process of the invention. After 5 and 10 weeks, osteogenesis of resultants was examined by histological analysis. The histological slice plots shown in FIG. 5 indicated that 5 weeks after the operation, only few new bones were produced in the control and most of the new tissues are soft tissues, whereas in the groups of Osteoset® and α-calcium sulfate hemihydrate produced by the process of the invention, the bone regeneration was very good and no inflammation was caused in these two groups.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A process for preparing α-calcium sulfate hemihydrate with high purity which comprises the following steps:
  a) adding aqueous solutions containing sulfate ions and calcium ions to calcium chloride solution with a range of concentration;
  c) reacting the mixture of a) at a range of temperature for an appropriate time;
  c) filtering and washing the reaction products of b) with a rinsing solvent to isolate the solid and liquid phases and remove the water or impurity;
  d) collecting and drying the solid phase to obtain α-calcium sulfate hemihydrate with high purity;
  wherein the relationship between the range of the concentration of calcium chloride (X, molarity) and the range of the reaction temperature (Y, ° C.) is shown as the following formula:
  $-0.4x^5+7.33x^4-52.83x^3+187.17x^2-328.27x+316 < y < 1.2x^5-22x^4+158.5x^3-561.5x^2+984.8x-588$ ($2 < X < 5$); wherein the temperature in b) is not provided by microwave and the sulfate ions and calcium ions in a) was not provided by calcium sulfate; and
  wherein the sulfate ions of step a) is selected from the group consisting of potassium sulfate, sodium sulfate and magnesium sulfate.

2. The process of claim 1, wherein the solution containing calcium ions of step a) is selected from the group consisting of calcium nitrate and calcium phosphate.

3. The process of claim 1, wherein the concentration of the calcium chloride solution ranges from 2M to 4M.

4. The process of claim 1, wherein the concentration of the calcium chloride solution ranges from 3M to 4M.

5. The process of claim 1, wherein the concentration of the calcium chloride solution is 2.5M, 3M, 3.5M or 4M.

6. The process of claim 1, wherein the reaction temperature of step b) is higher than 80° C. to lower than 110° C.

7. The process of claim 1, wherein the reaction temperature of step b) ranges from 90° C. to lower than 110° C.

8. The process of claim 1, wherein the reaction temperature of step b) ranges from 90° C. to 100° C.

9. The process of claim 1, wherein the reaction temperature of step b) is 90° C. or 100° C.

10. The process of claim 1, wherein the reaction time is over 2 hours.

11. The process of claim 1, wherein in the filtering and washing step of c), the rinsing solvent is an alcohol.

12. The process of claim 11, wherein the alcohol is selected from the group consisting of methanol, ethanol, propanol, butanol and pentanol.

13. The process of claim 11, wherein the alcohol is ethanol.

14. The process of claim 1, wherein the α-calcium sulfate hemihydrate produced by the process is α-calcium sulfate hemihydrate with high purity and can be used as a surgical implant.

15. The α-calcium sulfate hemihydrate produced by the process of claim 1.

* * * * *